US012792125B2

(12) United States Patent
Chang et al.

(10) Patent No.: US 12,792,125 B2
(45) Date of Patent: Nov. 10, 2026

(54) INFORMATION HANDLING SYSTEM BATTERY POWER TRANSFER OFF DURING MAINTENANCE SERVICE

(71) Applicant: Dell Products L.P., Round Rock, TX (US)

(72) Inventors: Yao-Tsung Chang, Taipei City (TW); Ernesto Ramirez, Austin, TX (US); Chen-Hsin Chang, Keelung (TW)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 18/824,505

(22) Filed: Sep. 4, 2024

(65) Prior Publication Data

US 2026/0064183 A1 Mar. 5, 2026

(51) Int. Cl.

| | |
|---|---|
| ***G06F 1/3234*** | (2019.01) |
| ***G06F 1/16*** | (2006.01) |
| ***G06F 1/183*** | (2026.01) |
| ***G06F 1/3206*** | (2019.01) |

(52) U.S. Cl.

CPC .......... *G06F 1/3234* (2013.01); *G06F 1/1616* (2013.01); *G06F 1/183* (2013.01); *G06F 1/3206* (2013.01)

(58) Field of Classification Search

CPC .... G06F 1/3234; G06F 1/1616; G06F 1/3206; G06F 1/183

See application file for complete search history.

(56) References Cited

U.S. PATENT DOCUMENTS

| | | | | |
|---|---|---|---|---|
| 7,391,184 | B2 | 6/2008 | Luo et al. | |
| 8,701,176 | B2 | 4/2014 | Ramsey et al. | |
| 8,701,188 | B2 | 4/2014 | Lee et al. | |
| 10,038,705 | B2 | 7/2018 | Jreij et al. | |
| 10,175,717 | B2 | 1/2019 | Lambert et al. | |
| 10,476,288 | B2 | 11/2019 | Sultenfuss et al. | |
| 10,671,765 | B2 | 6/2020 | Swierk et al. | |
| 10,742,427 | B2 | 8/2020 | Robinson et al. | |
| 11,429,755 | B2 | 8/2022 | Westphall et al. | |
| 11,495,121 | B2 | 11/2022 | Grobelny et al. | |
| 11,500,427 | B1 * | 11/2022 | Wang | H05K 1/116 |
| 11,522,357 | B2 | 12/2022 | Chen et al. | |
| 11,579,663 | B1 * | 2/2023 | Files | G06F 1/1637 |
| 2002/0085338 | A1 * | 7/2002 | Lin | G06F 1/1656 361/679.17 |
| 2018/0109129 | A1 | 4/2018 | Dai et al. | |
| 2019/0310689 | A1 * | 10/2019 | Itoh | G06F 1/3206 |
| 2021/0225159 | A1 * | 7/2021 | Grobelny | G08B 29/16 |
| 2022/0361266 | A1 * | 11/2022 | Ahmed | G06F 1/1616 |
| 2023/0275308 | A1 * | 8/2023 | Rodriguez | H01M 50/298 429/121 |
| 2024/0201755 | A1 * | 6/2024 | Chou | G06F 1/184 |
| 2024/0258813 | A1 * | 8/2024 | Morrison | G06F 1/26 |

* cited by examiner

*Primary Examiner* — Raymond N Phan

(74) *Attorney, Agent, or Firm* — ZAGORIN CAVE LLP; Robert W. Holland

(57) ABSTRACT

A portable information handling system cuts off power from a battery when a keystone of the housing is removed to have an incomplete detection circuit, such as by removing a ground post from contact against a motherboard conductive pad. An embedded controller detects the incomplete detection circuit and in response receives power when powered down, detects a power state of a system processor, powers down the system processor when on, and then removes power communication from the battery by commanding the battery to a storage mode.

17 Claims, 6 Drawing Sheets

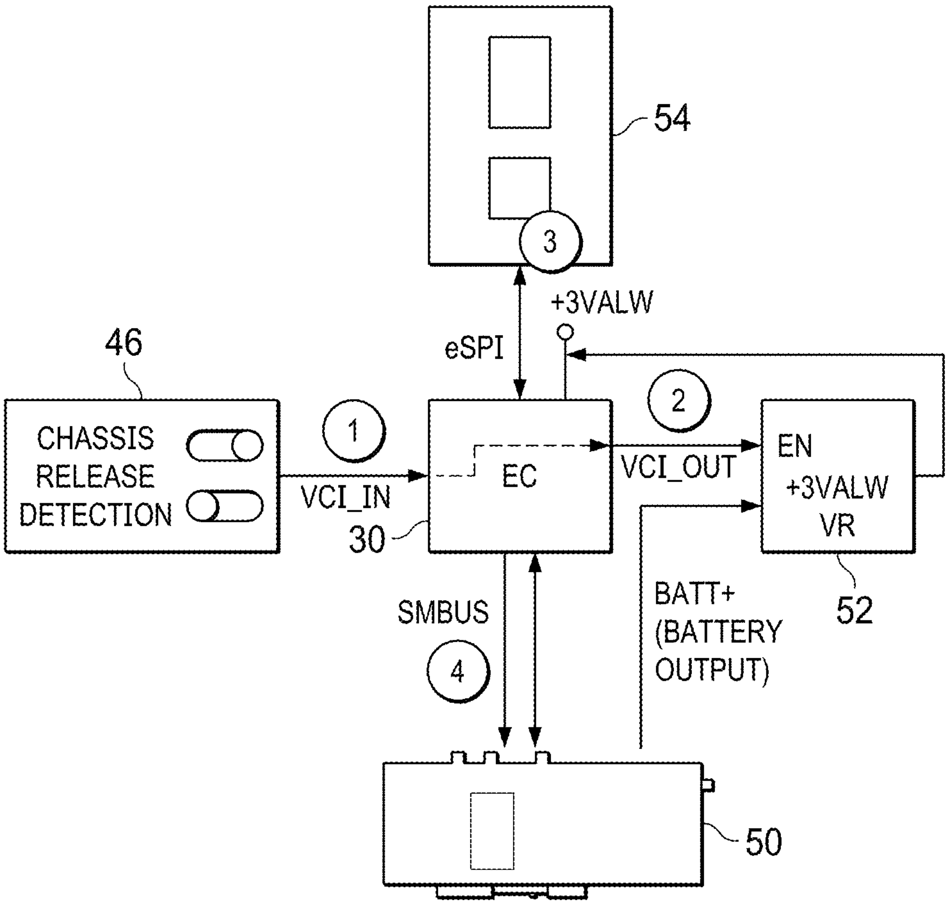

(1) THE CHASSIS RELEASE DETECTION IS DEFINED AS A MECHANICAL PART REMOVAL FROM THE NB SYSTEM (2) THE CHASSIS RELEASE DETECTION IS UTILIZED TO ENABLE *EC +3VALW* POWER THROUGH *VCI_OUT*

(3) GET THE SYSTEM'S POWER STATE THROUGH THE PCH BY *CHECKING THE S3/S4/S5 STATUS*. THIS PROCEDURE IS TO WELL DETERMINE WHETHER TO TRIGGER SYSTEM SHUTDOWN COMMANDS, WHICH WILL BE ENSURING THE SYSTEM IS PROPERLY SHUT DOWN BEFORE THE BATTERY OUTPUT IS TURNED OFF.

(4) ACTIVATE THE BATTERY'S STORAGE MODE USING THE EC SMBUS COMMAND TO TURN OFF BATTERY OUTPUT. THEN THE SERVICE TECHNICIAN WILL NO LONGER REQUIRE TO TEAR DOWN ALL PARTS TO DISCONNECT BATTERY CABLE.

FIG. 3

INFORMATION HANDLING SYSTEM BATTERY POWER TRANSFER OFF DURING MAINTENANCE SERVICE

BACKGROUND OF THE INVENTION

Field of the Invention

The present invention relates in general to the field of portable information handling systems, and more particularly to an information handling system battery management during maintenance service.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Portable information handling systems have a large number of processing components that cooperate to process information. Although a portable information handling system can disassemble to repair components that fail, a typical portable information handling system housing has a compact design with a precise arrangement of components to minimize system footprint. A typical disassembly involves removal of a keyboard and housing cover to reach a motherboard coupled in the main housing interior. In some instances, a main housing exterior detaches to provide access to the motherboard bottom surface. Some portable information handling systems are designed to restrict access to the display panel in a lid housing portion unless the main housing portion is broke down to at least some extent. All of these different arrangements can result in more complex servicing that can discourage end users from performing system improvements, such as adding DRAM and SSD storage. Even when a component that needs service is readily accessible, a portable information handling system will sometimes demand a substantial disassembly so that battery power is disconnected from the processing components during the servicing.

DELL INC. has introduced a keystone housing assembly having a keystone of the housing that, when removed, releases the information handling system for disassembly, such as is described in U.S. patent application Ser. No. 18/081,098, entitled "Information Handling System Security Lock and Keystone Housing Assembly," by Morrison et al., filed on Dec. 14, 2022, which is incorporated herein as if fully set forth., and U.S. Pat. No. 11,579,663 entitled "Modular Information Handling System with Automated Housing Cover Removal," by Files et al., issued Feb. 14, 2023, which is incorporated herein as if fully set forth. A keystone couples to the housing near the hinge to engage the keyboard in place. When the keystone is removed, the keyboard, housing cover and even the display panel are released without tool for a rapid disassembly. One difficulty with this approach is that power from a battery remains applied to the processing components until the battery is accessed and disconnected.

SUMMARY OF THE INVENTION

Therefore, a need has arisen for a system and method which disconnects battery power at release of a housing keystone.

In accordance with the present invention, a system and method are provided which substantially reduce the disadvantages and problems associated with previous methods and systems for managing battery power at a maintenance service. Removal of a keystone at a housing is detected as an indication to remove power from an information handling system. In response a battery of the information handling system is cut off from communication of power to the system motherboard.

More specifically, a portable information handling system housing has plural housing portions assembled so that a keystone is removed before access to the interior of the housing. When the keystone is removed, a detection circuit signals an embedded controller and commands power to the embedded controller when the system is off. The embedded controller checks that operational status of the processor, such as the ACPI state, and powers off the processor if the system in on. The embedded controller then commands the battery to a storage mode that cuts off power communication from the battery to the motherboard.

The present invention provides a number of important technical advantages. One example of an important technical advantage is that an information handling system automatically removes power communication from a battery to a motherboard when an open chassis event is detected, such as by transition of a complete ground circuit to a GPIO of an embedded controller to an incomplete ground circuit. Cutting off battery power to the motherboard before the housing opens reduces the risk of shock or damage to electronic components.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 depicts a circuit block diagram of a circuit and process for managing power transfer from a battery when a housing is opened;

DETAILED DESCRIPTION

A portable information handling system housing keystone breaks a detection circuit when removed to command a cut off of power from a battery. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
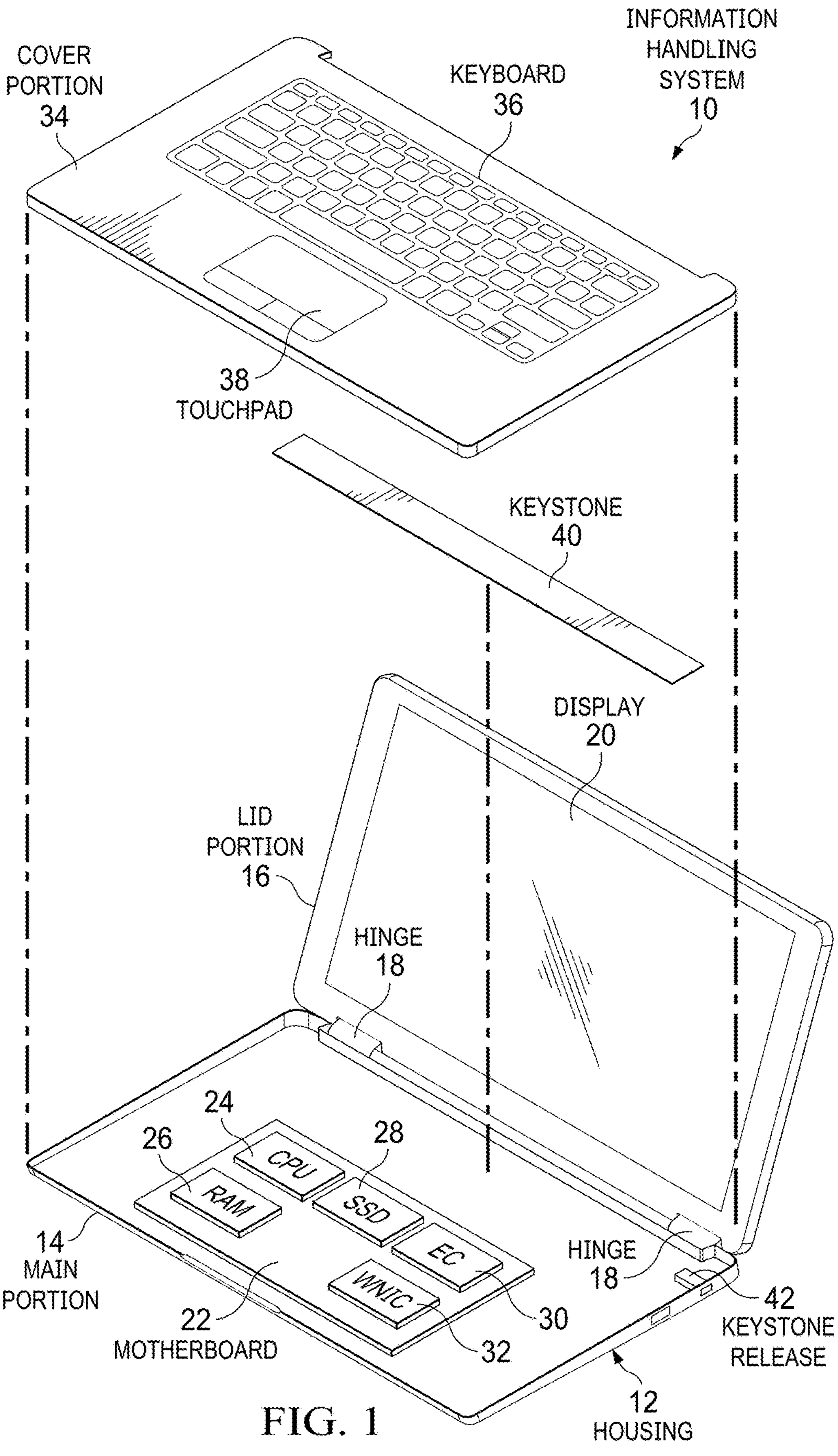
FIG. 1 depicts an exploded upper perspective view of a portable information handling system configured to cut off battery power when a keystone is removed from the housing.

Referring now to FIG. 1, an exploded upper perspective view depicts a portable information handling system 10 configured to cut off battery power when a keystone 40 is removed from the housing 12. In the example embodiment, housing 12 has a convertible configuration with a housing main portion 14 rotationally coupled to a housing lid portion 16 with hinges 18. A display 20 couples in lid portion 16 to present information as visual images. A motherboard 22 couples in the interior of main portion 14 to interface processing components that cooperate to process information. For example, a central processing unit (CPU) 24 executes instructions to process information in cooperation with a random access memory (RAM) 26 that stores the instructions and information. A solid state drive (SSD) 28 stores information in non-transitory memory, such as flash, as persistent storage. For instance, an operating system and applications stored in SSD 28 in a power down state are retrieved to RAM 26 for execution on CPU 24 by pre-boot instructions executing on an embedded controller 30. Embedded controller 30 executes embedded code retrieved from non-transitory memory to manage operating conditions within housing 12, such as the application of power and maintenance of thermal constraints. A wireless network interface controller (WNIC) 32 provides network and wireless communication with external devices, such as through WIFI and BLUETOOTH.

Housing 12 assembles with a housing cover portion 34 that couples over housing main portion 14 and supports at an upper surface a keyboard 36 that accepts keyed inputs and a touchpad 38 that accepts touch inputs. Cover portion 34 couples in place with a keystone 40 that fits between cover portion 34 and lid portion 16. When keystone 40 assembles to cover portion 34 and main portion 14, it secures the assembly in place. To disassemble information handling system 10, a keystone release 42 is actuated that releases keystone 40 to lift up and away from main portion 14. Once keystone 40 is removed, the remainder of the information handling system disassembles without tools. Keystone 40 is the first part of the system to remove from the information handling system to perform a disassembly. Unless keystone 40 is removed, the housing will not disassemble to provide access to the main portion; once keystone 40 is removed, access to the main portion interior is performed with a toolless disassembly. As a result, detecting removal of the keystone is the trigger that shuts down power communication from a battery to the motherboard.

Figure 2A:
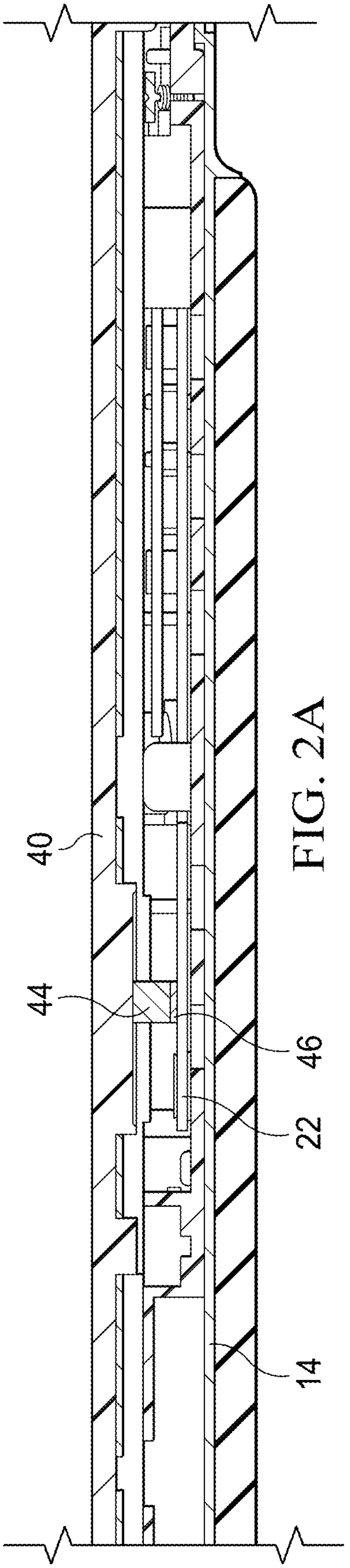
FIGS. 2A and 2B depict a side sectional view of an example embodiment of a keystone at a housing cover portion that is monitored to detect disassembly of the housing and trigger a battery power communication cut off.
Figure 2B:
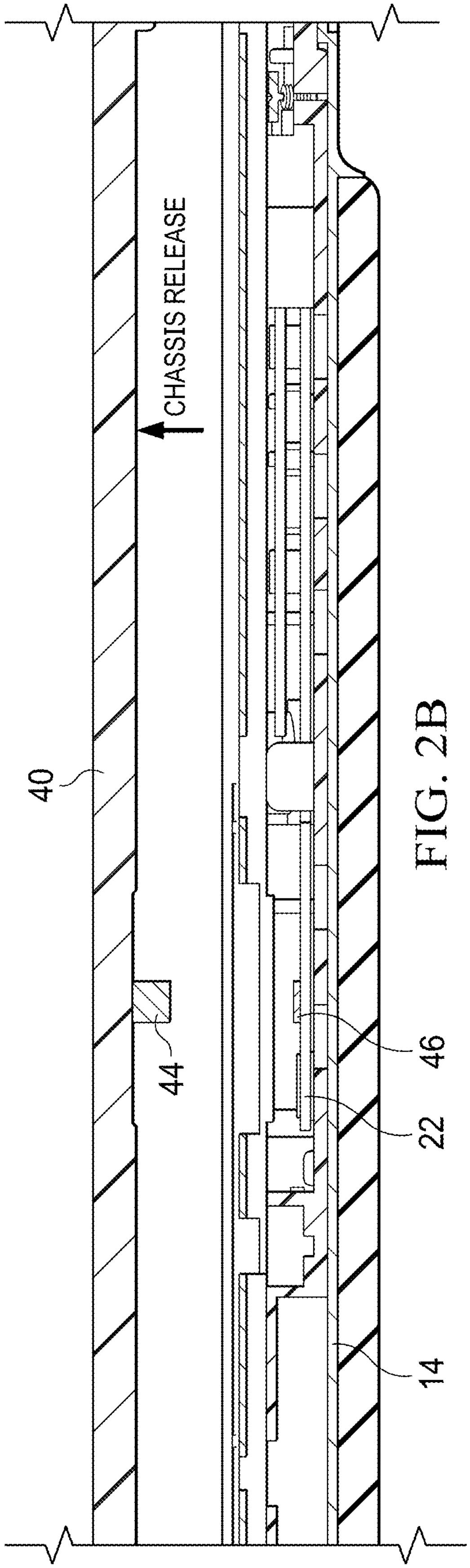

Referring now to FIGS. 2A and 2B, a side sectional view depicts an example embodiment of a keystone 40 at a housing cover portion that is monitored to detect disassembly of the housing and trigger a battery power communication cut off. FIG. 2A depicts keystone 40 coupled to housing main portion 14 over motherboard 22. In the example embodiment, keystone 40 includes a conductive material that shares a system ground with housing main portion 14. A conductive member 44 extends down from the inner surface of keystone 40 and presses against a conductive pad 46 exposed on motherboard 22. FIG. 2B depicts keystone 40 lifted from housing main portion 14 so that conductive member 44 disconnects from conductive pad 46 to indicate that the keystone is removed and battery power should be cut off. In the example embodiment, conductive pad 46 interfaces with the system embedded controller so that the disconnection from ground is detected, such as with a pullup resistor or by the natural float of the pin when ground is disconnected. In various embodiments, the contact of conductive member 44 to conductive pad 46 may include a biasing member, such as a pogo pin, that presses inward, and/or a shaped conductive pad that maintains a conductive contact when keystone 40 is coupled in place. Although the example embodiment depicts the conductive member extending from a keystone, in alternative embodiments, the conductive member may come from other housing elements that indicate a pending exposure of electrical components, such as removal of a keyboard or removal of a housing cover portion. In one alternative embodiment, pressing the keystone release may trigger detection of keystone removal to command battery power cut off.

In the example embodiment, battery power cut off from the main board is managed by logic executing on the embedded controller. The embedded controller manages power application to the motherboard and interfaces with a battery processor to command the battery shutdown, as is set forth in greater detail below. In alternative embodiments, the conductive pad 46 can initiate a battery power cut off in other ways. For instance, the loss of ground at the conductive pad may be communicated through the motherboard and to a battery processing resource, such as a battery management unit (BMU) so that the battery shuts power off to the motherboard without a command from the embedded controller. In such an embodiment, the battery may communicate a pending power cut off to the embedded controller so that the embedded controller can bring the system to an off state before power is cut off. As an alternative, conductive pad 46 may have a conductive split pad that has a completed circuit across separate elements of the conductive pad by the contact of the conductive member. When the conductive member is removed, ground may be cut off to the battery, for example, so that the battery stops communicating power. Alternatively, an SMBus or other component communication link may pass through the conductive pad with the battery shutting down power communication when the communication link is broken down. In another alternative embodiment, conductive member 44 may be isolated from ground and provide a conduit through which power travels from the battery to the motherboard across a split pad so that removal of the keystone removes power by breaking the power transfer circuit.

Referring now to FIG. 3, a circuit block diagram depicts a circuit and process for managing power transfer from a battery when a housing is opened. In the example embodiment, a ground conductive pad 46 interfaces with a GPIO of an embedded controller 30 at VC_IN to detect a low signal when a keystone is coupled in place and a high signal when ground is disconnected by removal of the keystone. In various embodiments, the ground is provided by a mechanical part interface with the conductive pad where the mechanical part's removal release is needed for the housing to open. When the signal is detected at the embedded controller, an enable signal is generated at VCI_OUT to a power source controller, such as a charger integrated circuit 52. In response, a 3 volt output EC+3VALW is commanded that feeds to an embedded controller power-in so that the embedded controller has power to execute instructions. In a situation where the embedded controller already has power and is executing instructions, this power application may be skipped. Embedded controller 30 executes code from a non-transitory memory 54, such as flash memory interfaced through eSPI, and retrieves through the platform controller hub (PCH) and ACPI state of the processor. When the power state is S3/S4/S5, the processor is in an off state so that battery power may be cut off. When the processor is in an on state, embedded controller 30 commands a transition to a power off state. Once the processor is off, embedded controller commands through an SMBus a storage mode of battery 50 so that power transfer from the battery is cut off. This allows a technician to address a repair or maintenance without having to tear the system down to a point where the battery can be shut off. In one example embodiment, a display presentation is made at the display indicating to an end user that a power down of the system is being commanded due to detection of an open chassis event.

Figure 4:
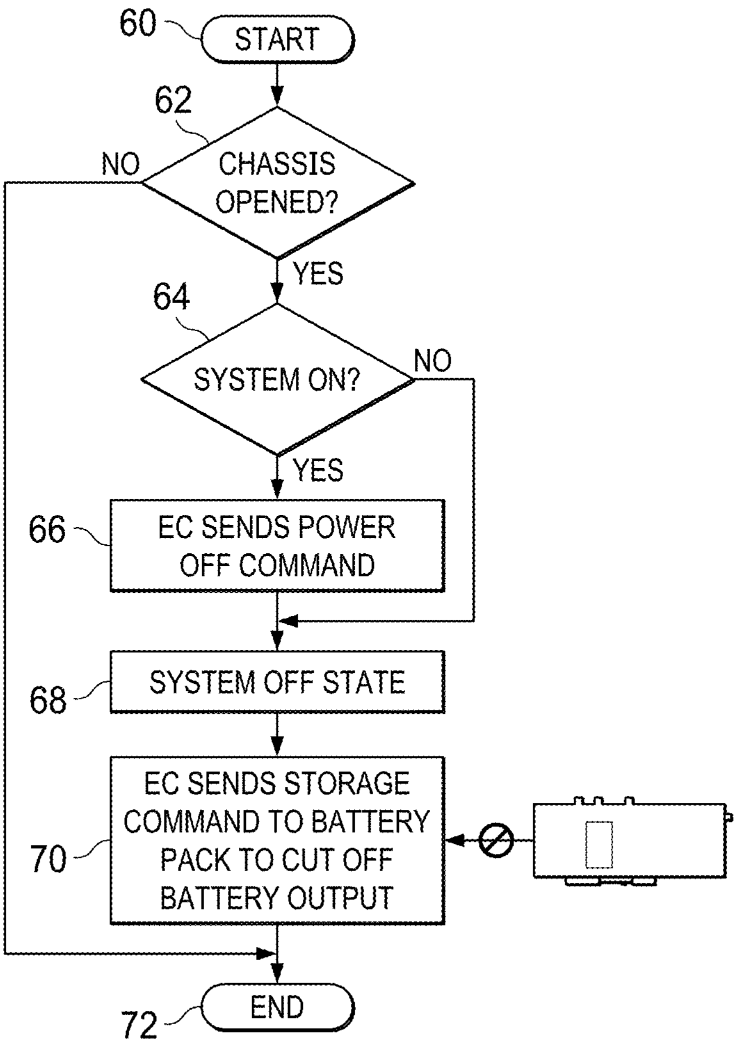
FIG. 4 depicts a flow diagram of a process for managing power communication from battery when an information handling system housing is opened.

Referring now to FIG. 4, a flow diagram depicts a process for managing power communication from battery when an information handling system housing is opened. The process starts at step 60 and determines at step 62 if the chassis is open by detecting a complete or incomplete ground circuit between the keystone and motherboard. When the circuit is incomplete, the process continues to step 64 to determine if the processor is in an on state executing instructions or an off state. If the processor is on, the process continues to step 66 for the embedded controller to issue an ACPI power off command. When the processor is in an off state, the process continues to step 68 to confirm that the system is shutdown in a power off state and at step 70 the embedded controller sends a storage mode command to the battery to cut off battery output to the motherboard. The process ends at step 72 with power removed from the motherboard when the housing is disassembled.

Figure 5:
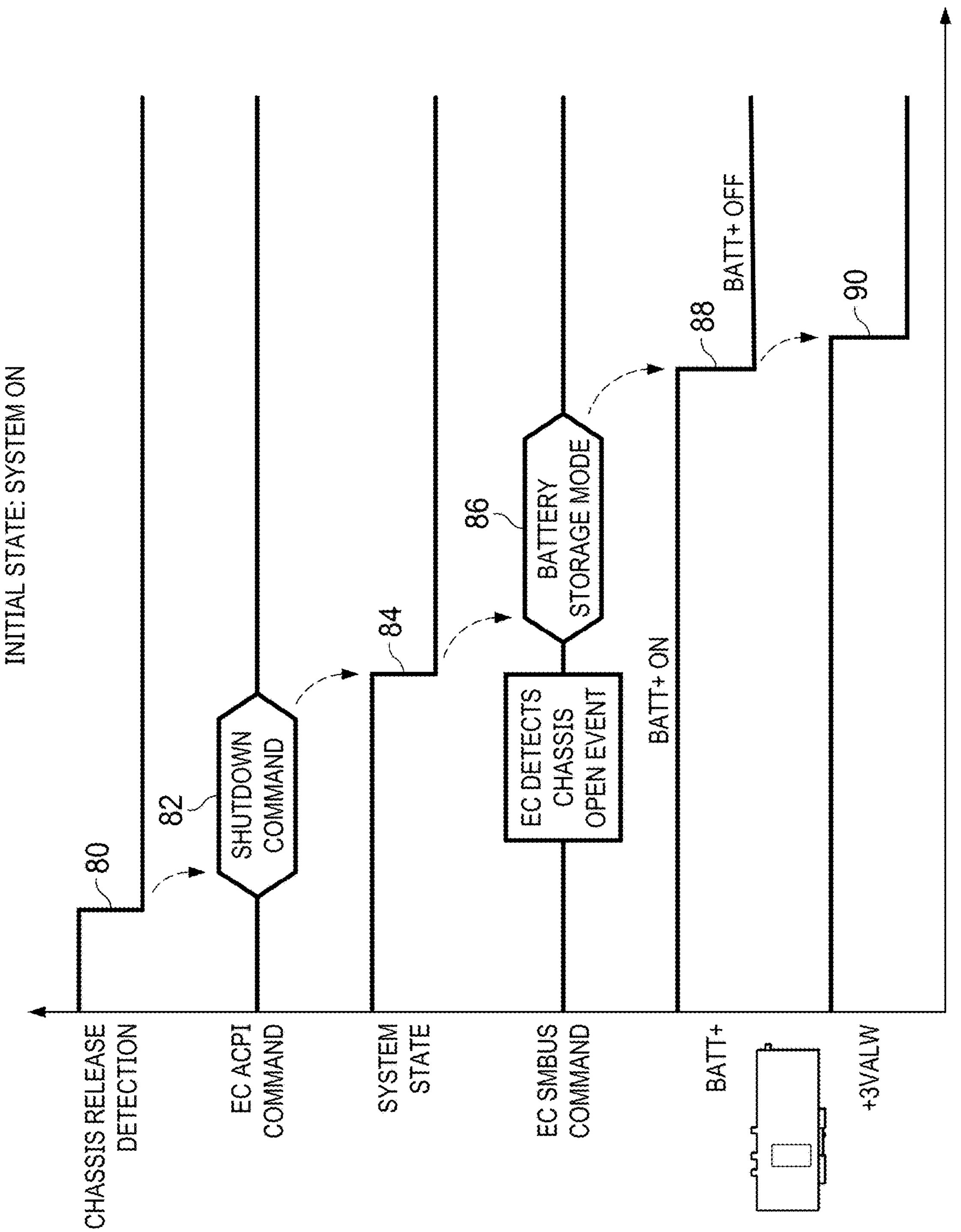
FIG. 5 depicts a timing diagram of a process for cutting off power transfer from a battery when a processor is in an on state.

Referring now to FIG. 5, a timing diagram depicts a process for cutting off power transfer from a battery when a processor is in an on state. At step 80 a chassis release is detected, such as at a transition of a complete ground circuit to an incomplete circuit. At step 82, an embedded controller ACPI shutdown command issues to the processor. At step 84 the processor powers off in a controlled shutdown and the embedded controller detects the chassis open event with the incomplete ground circuit at a GPIO. In response at step 86 the embedded controller commands the battery storage mode. At step 88 the battery responds to the storage mode by shutting off power transfer to the motherboard. Once power is shut off to the motherboard, at step 90 the power at the embedded controller is cut off.

Figure 6:
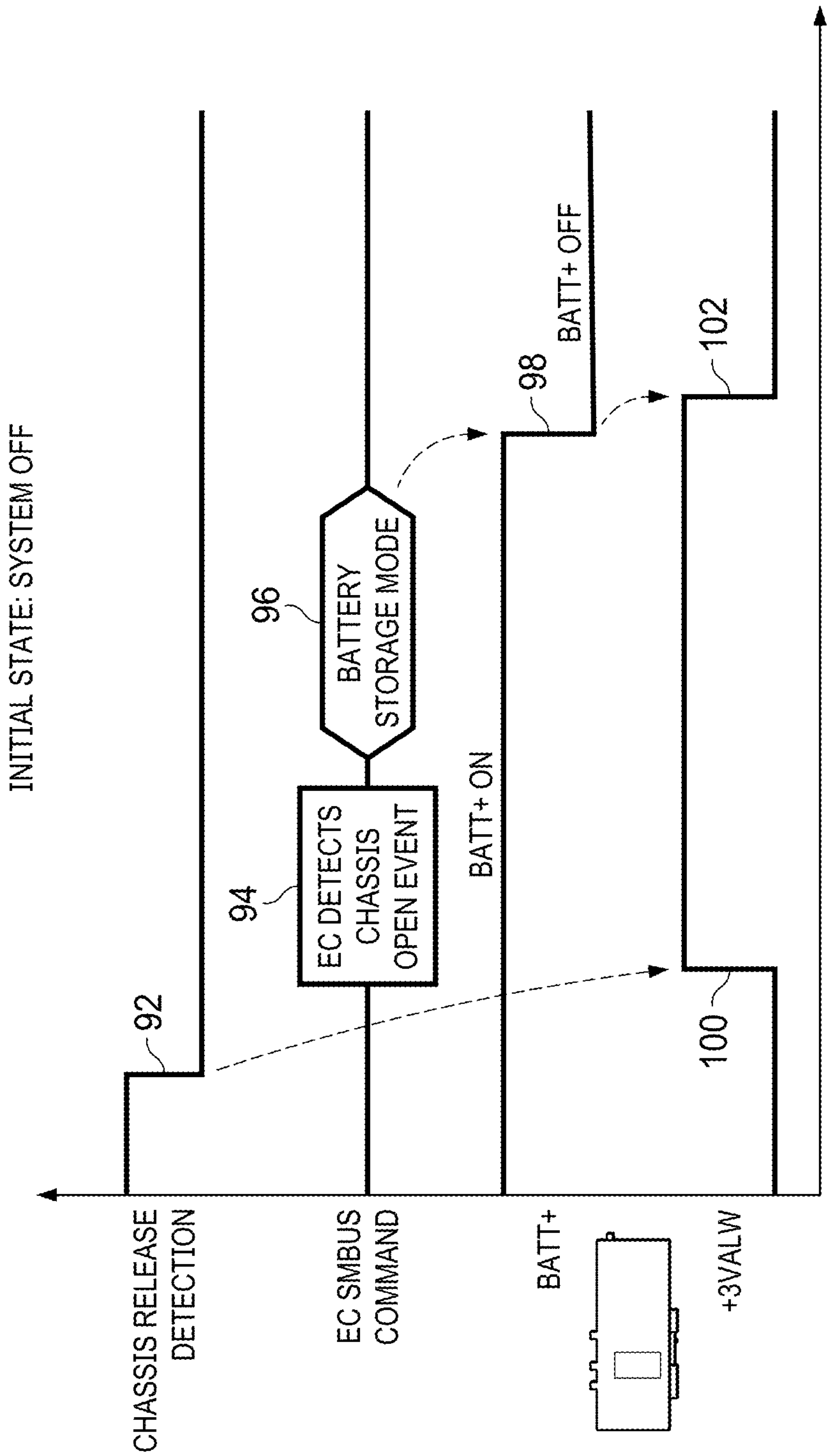
FIG. 6 depicts a timing diagram of a process for cutting off power transfer from a battery when a processor is in an off state.

Referring now to FIG. 6, a timing diagram depicts a process for cutting off power transfer from a battery when a processor is in an on state. At step 92 a chassis release is detected by transition of the completed ground circuit to an incomplete ground circuit. In response at step 100 three volts is commanded to power the embedded controller. Once the embedded controller has powered up, at step 94 the embedded controller detects the chassis open event and at step 96 commands a battery storage mode. At step 98 the battery cuts off power to the motherboard. At step 102 the power is removed from the embedded controller.

Although the present invention has been described in detail, it should be understood that various changes, substitutions and alterations can be made hereto without departing from the spirit and scope of the invention as defined by the appended claims.

What is claimed is:

1. An information handling system comprising:

a portable housing having a main portion rotationally coupled to a lid portion and a cover portion coupled over the main portion;

a motherboard coupled in the main portion;

a processer coupled to the motherboard and operable to execute instructions that process information;

a memory coupled to the motherboard and interfaced with the processor, the memory operable to store the instructions and information;

a battery coupled to the main portion and interfaced with the motherboard to power the motherboard;

an embedded controller coupled to the motherboard and interfaced with the battery;

a keystone coupling the main portion and the cover portion, the keystone configured to remove and thereby release the cover portion from the main portion to expose the motherboard, the keystone having a conductive member directed into an interior of the main portion to contact against a conductive pad of the motherboard; and a non-transient memory interfaced with the embedded controller and storing instructions that when executed on the embedded controller cause:

detect removal of the keystone conductive member from the conductive pad;

determine at the embedded controller a power state of the processor; and when the determined processor power state is off, command a battery storage mode to cease communication of power from the battery to the motherboard.

2. The information handling system of claim 1 wherein:

the keystone comprises a planar piece adjacent the lid portion and grounded to the main portion; and the embedded controller detects removal of the keystone when the conductive pad loses a ground interface.

3. The information handling system of claim 1 wherein the instructions further cause:

detect at the embedded controller of a GPIO input from the removal of the keystone conductive member from the conductive pad; and in response to the GPIO input, communicate to a power source to power the embedded controller.

4. The information handling system of claim 1 wherein the conductive pad completes ground to the battery through the motherboard when the conductive member contacts the conductive pad.

5. The information handling system of claim 1 wherein the conductive member comprises a spring biased contact.

6. The information handling system of claim 1 wherein the instructions further in response to the detection present at the display a visual indication that power will shutdown.

7. The information handling system of claim 3 wherein the instructions further:

determine at the embedded controller a power state of the processor; and when the determined processor power state is on, command a shutdown of the processor.

8. The information handling system of claim 7 wherein the instructions further:

detect an off power state of the processor in response to the commanding a shutdown; and in response to the off power state of the processor, command a battery storage mode to cease communication of power from the battery to the motherboard.

9. A method for managing information handling system battery power, the method comprising:

securing a housing with a keystone having a conductive member within the housing interior;

interfacing the conductive member with a conductive pad coupled to a motherboard in the housing interior to complete a detection circuit;

communicating between the battery and an embedded controller of the motherboard through the complete detection circuit;

removing the keystone;

detecting an incomplete detection circuit in response to the removing; and in response to the loss of communication by the incomplete detection circuit, cutting off power transfer from a battery to the motherboard.

10. The method of claim 9 further comprising:

in response to the incomplete detection circuit, commanding power to an embedded controller of the motherboard; and in response to the commanding power, determining with the embedded controller a power state of a processor of the motherboard.

11. The method of claim 9 wherein the keystone comprises a planar piece place on an upper side of a main portion adjacent a lid portion and grounded to the main portion.

12. The method of claim 9 further comprising:

communicating a ground of the battery with the motherboard through the conductive pad; and cutting off power transfer from the battery in response to removal of the communicating of the ground by the incomplete detection circuit.

13. The method of claim 10 further comprising:

when the processor has an on power state, first commanding the processor to an off power state and then second commanding the battery power transfer cutoff; and when the processor has an off power state, commanding the battery power transfer cutoff.

14. The method of claim 13 further comprising presenting at a display of the information handling system a visual indication of power shutdown.

15. A system for managing information handling system battery power comprising:

an embedded controller interfaced with the battery; and a non-transitory memory interfaced with the embedded controller and storing instructions that when executed on the embedded controller cause:

detecting an incomplete detection circuit in response to removing a keystone from a housing of the information handling system;

in response to the incomplete detection circuit, commanding power to the embedded controller;

in response to the commanding power, determining with the embedded controller a power state of a processor of the information handling system; and in response to the incomplete detection circuit, cutting off power transfer from a battery to the motherboard.

16. The system of claim 15 wherein the instructions further cause:

when the processor has an on power state, first commanding the processor to an off power state and then second commanding the battery power transfer cutoff; and when the processor has an off power state, commanding the battery power transfer cutoff.

17. The system of claim 16 wherein the embedded controller cuts off power communicated from the battery by commanding a storage mode.

* * * * *